United States Patent [19]

Rupp

[11] Patent Number: 4,632,050

[45] Date of Patent: Dec. 30, 1986

[54] SPORTFISHING OUTRIGGERS

[76] Inventor: Herbert E. Rupp, 4761 Anchor Ave., Port Salerno, Fla. 33492

[21] Appl. No.: 816,330

[22] Filed: Jan. 6, 1986

[51] Int. Cl.$^4$ .............................................. B63B 35/14
[52] U.S. Cl. ....................................... 114/255; 114/89; 114/221 R; 403/2; 403/122; 403/361
[58] Field of Search ...................................... 114/89–97, 114/100–102, 255, 221 R; 403/2, 361, 372, 227, 115, 122

[56] References Cited

U.S. PATENT DOCUMENTS 3,986,474  10/1976  King ........................................ 114/90
4,230,060  10/1980  McCoy ............................. 114/102 X

FOREIGN PATENT DOCUMENTS 1212517  11/1970  United Kingdom .................. 114/92

OTHER PUBLICATIONS

Lewis Marine Supply, Inc., Catalog No. 1882, 4/1982, "Outriggers", pp. 592–596.

Primary Examiner—Sherman D. Basinger
Assistant Examiner—Paul E. Salmon
Attorney, Agent, or Firm—Carroll F. Palmer

[57] ABSTRACT

Outriggers for sportfishing boats of the tubular mast type strengthened by a plurality of longitudinal truss cables to resist mast bending are improved by new spreader assemblies that include unique cable spreader arms that have (a) tubular sockets on their inboard end, (b) a cable guide through which an anti-bending cable passes removably fitted into their outboard end and (c) a frangible portion in the arm to break when the arm is overloaded. The improved spreader assemblies include (1) a collar, sized to encircle the mast and (2) a plurality of lateral posts, each threaded at one end into the collar and sized to slideably receive the tubular socket of one of the spreader arms to retain the arm extending laterally outwardly from the collar creating a cable truss member. The truss cables are connected to the mast via unique ball-anchor lugs formed as integral portions of the mast collars.

10 Claims, 10 Drawing Figures

SPORTFISHING OUTRIGGERS

BACKGROUND OF THE INVENTION

1. Field of the Invention

This invention relates generally to outrigger mast structures. More particularly, it concerns novel and improved outrigger masts of the cable trussed type used on sportfishing boats.

2. Description of the Prior Art

Outrigger masts are frequently used on sportfishing boats to releasably hold a fishing line outboard of the boat. The purpose of such outrigger systems is to trail the fishing line from a position to the side of the boat and well above the water so that a number of separate baits can be trolled astern at the same time to be positioned in the water at laterally spaced positions. This is accomplished by running the fishing line from the fishing pole in the boat cockpit to a release clip mounted on a rigging halyard carried by the outrigger and thence astern of the boat. The release clip is arranged so that when a fish strikes the bait, the line will separate from the outrigger system and allow the angler to play the fish directly from his fishing pole in the boat cockpit.

On smaller boats, an outrigger system can be a simple pole that carries the rigging halyard. However, on larger boats the outriggers need to be as long as 30 to 40 feet and a simple pole of this length will, unless of intolerable diameter and weight, quickly buckle under the loads imposed by wave action, line tension, etc. Hence, large boat outriggers are formed of a tubular mast of modest diameter which is strenghtened against bending or buckling by longitudinal cable truss systems that include spreader arms to stand off the cable from the mast to create a truss unit.

In the past, spreaders for the outriggers have usually been formed as a metal casting provided with a central collar through which the mast extends with four integral, symmetrically positioned lateral spreader arms carrying truss cable guides bolted to their outer ends. Such cast spreaders tend to corrode, are relatively heavy and, if damaged, must usually be replaced in their entirety, thereby requiring disassembly of the outrigger. Such damage can result, for example, from wear of the cables, or by accidental hitting of some part thereof, e.g., a spreader arm, cable, etc., against a dock, bridge, or the like.

Some examples of prior known mast spreader systems are disclosed in U.S. Pat. Nos. 879,986; 3,194,202; 3,312,020 and 4,068,607.

In spite of the fact that sportfishing boat outriggers have been around for many years and numerous persons have tried their hands at making improvements on them, there exists a need for improvement particularly with respect to weight reduction and simplification of their assembly, repair and maintenance.

OBJECTS

A principal object of the invention is the provision of improved forms of sportfishing boat outriggers.

Further objects include the provision of:

1. New forms of cable trussed outrigger masts that are improved to protect them from appreciable damage upon inadvertent impact with pilings, bridges, docks, etc., 2. Improved spreader assemblies for such outriggers that protect them from appreciable damage upon overloading of a spreader arm or cable, 3. Such assemblies that permit broken spreader arms to be replaced without need to take the outrigger mast apart or to remove the spreader assembly from the mast.

4. Unique cable guides on outrigger spreader arms that may be replaced without replacement of the entire spreader arm.

5. New cable anchor systems for truss cables in mast assemblies.

Other objects and further scope of applicability of the present invention will become apparent from the detailed description given hereinafter; it should be understood, however, that the detailed description, while indicating preferred embodiments of the invention, is given by way of illustration only, since various changes and modifications within the spirit and scope of the invention will become apparent to those skilled in the art from this detailed description.

SUMMARY OF THE INVENTION

The objects are accomplished in accordance with the invention by providing improvements in outriggers used on sportfishing boats of the cable trussed type, namely, outtriggers having (a) a tubular mast including an inboard end and an outboard end, (b) pivot means connected to the inboard end to permit the outrigger to move from a stowage position to a fishing position, (c) a plurality of truss cables defined by an inboard end, an outboard end and a central section extending therebetween, (d) the cables being positioned about and extending longitudinally of the mast to resist bending thereof and (e) at least one spreader assembly carried by the mast comprising (f) a plurality of tubular spreader arms each having (g) an inboard end and an outboard end integral with a central body section, (h) each spreader being associated with one of the cables to forceably stand off the central section of the cable laterally from the mast.

The improvements for such outriggers that characterize the invention include (1) spreader arms that each comprise a tubular socket on the inboard end, a cable guide through which one of the cables passes, the guide being removably fitted into the outboard end of the arm, and a frangible portion in the central body section contoured to break when the spreader arm is overloaded, (2) spreader assemblies that comprise a collar sized to encircle the mast, a plurality of posts, each threaded at one end into the collar and sized to tightly receive the tubular socket of one of the spreader arms to retain it extending radially outwardly from the collar, and (3) unique anchor lug sockets on mast collars by which to connect the truss cables to the outrigger mast.

In preferred embodiments, the posts and sockets of the spreader assemblies are cylindrical in shape, the posts have a plurality of peripheral grooves therein, each groove contains an O-ring and the O-rings constitute the elements that the socket of a spreader arm engages for retention thereof on the post and collar.

Also, the inboard ends of the truss cables are tipped with swedged balls and the spreader collars have anchor lugs extending laterally therefrom adjacent each of the posts to receive and hold one of the cable end balls. Each anchor lug is positioned relative to its respective post so that when the socket of a spreader arm is in place upon the post the ball received in the anchor lug is locked in place by the socket.

Further, the preferred spreader arms are tapered downward from the socket to the outboard end and the frangible part of the arm is the junction between the socket and the central body section.

Advantageously, the mast decreases in diameter from the inboard end to the outboard end with the mast being formed of a plurality of tubular sections of decreasing diameter that are telescoped together and fixed in position by the collars of the spreader assemblies.

As an additional feature, the new outriggers have second mast collars that don't carry spreader arms, but do have a plurality of cable anchor lugs extending laterally therefrom, each such anchor lug being dished to receive and hold one of the cable end balls. A truss cable will be held at one end by an anchor lug of such second collars and at the other end by an anchor lug on one of the spreader collars.

BRIEF DESCRIPTION OF THE DRAWINGS

A more complete understanding of the invention may be had by reference to the accompanying drawings in which.

DESCRIPTION OF THE PREFERRED EMBODIMENTS

Figure 1:
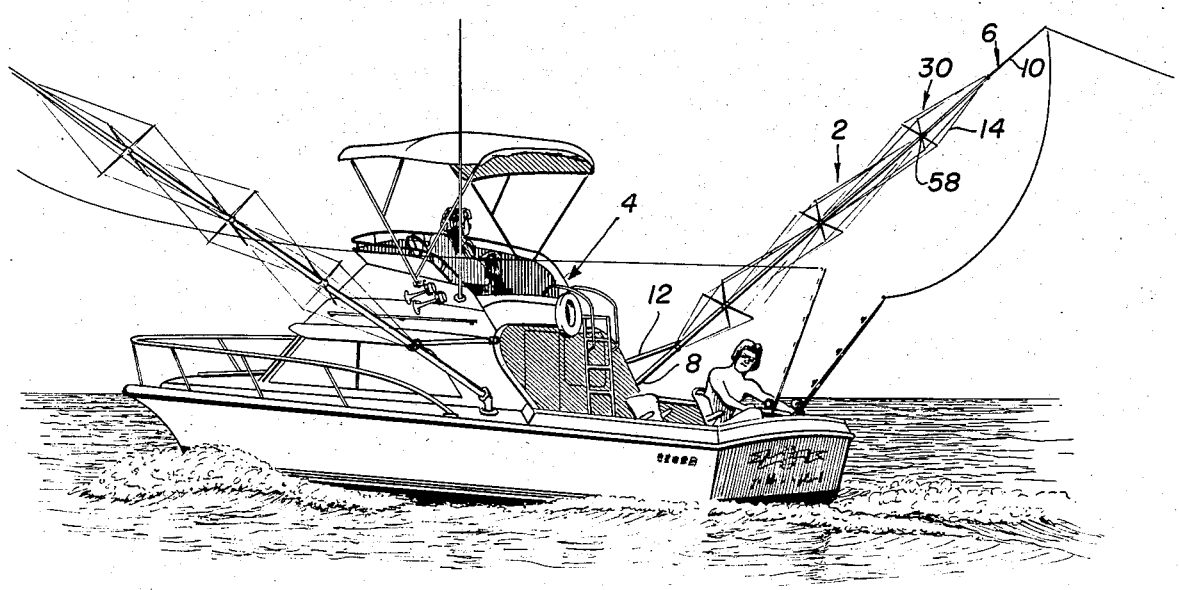
FIG. 1 is a perspective view of a sportfishing boat equipped with a pair of outriggers of the invention.

Referring in detail to the drawings, in which identical parts are identically marked, the invention provides improvements in outriggers 2 for a sportfishing boat 4 having a tubular mast 6 including an inboard end 8 and an outboard end 10. Pivot means 12 is connected to the inboard ends 8 to permit the outriggers 2 to move from a stowage position (not shown) to a fishing position as shown in FIG. 1. The pivot means 12 is conventional and may be varied in structure depending on the type and size of the boat on which the outriggers 2 are mounted.

A plurality of truss cables 14, with an inboard end 16, an outboard end 18 and a central section 20 extending therebetween, are positioned about and extend longitudinally of the mast 6 to resist bending thereof.

Figure 2:
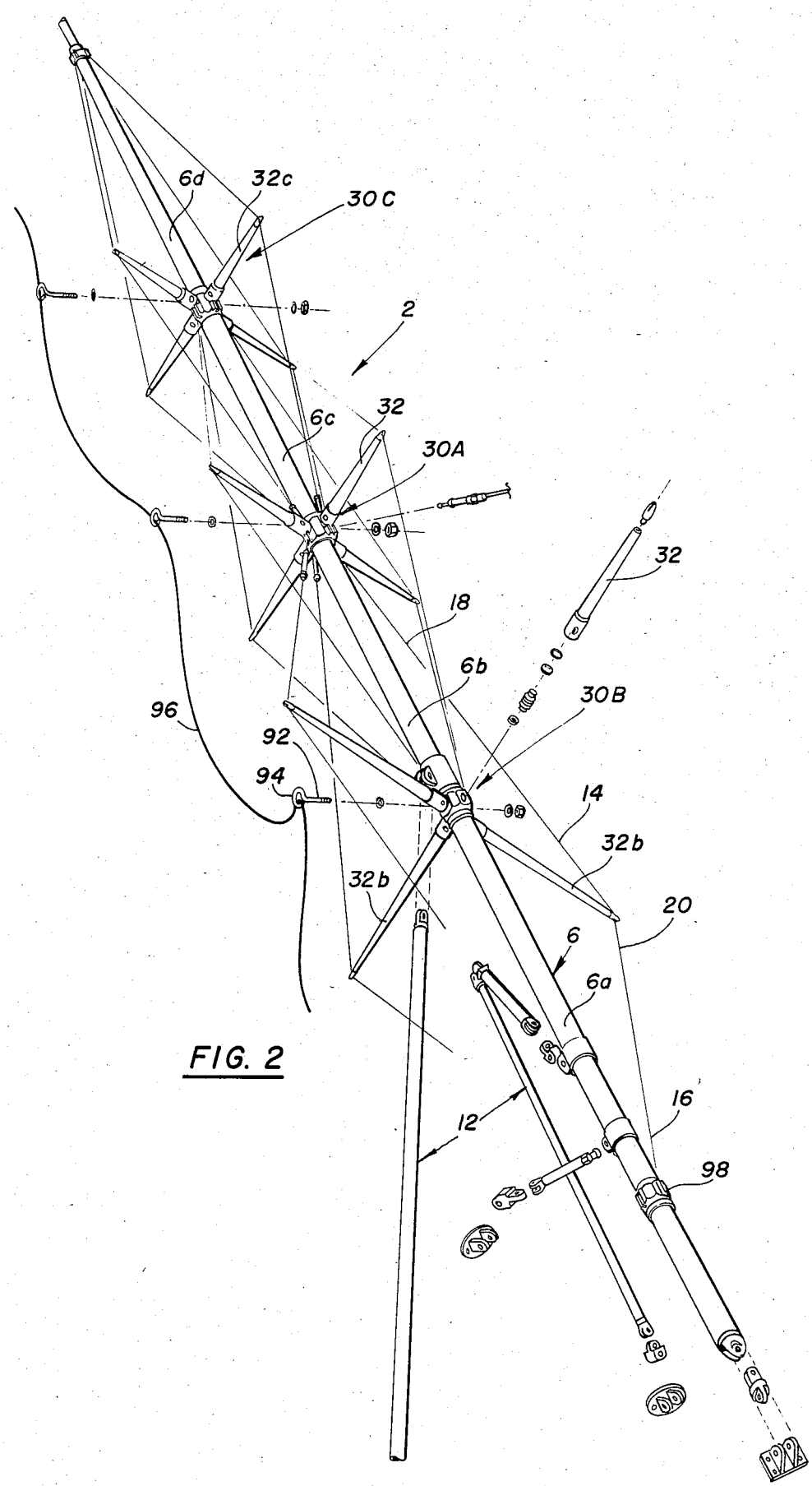
FIG. 2 is an exploded, isometric view of an outrigger of the invention.

The new outriggers may comrise several embodiments of spreader assemblies 30. Thus, FIG. 2 shows an outrigger 2 with a first embodiment 30A, a second embodiment 30B and a third embodiment 30C.

Each spreader assembly 30 comprises a plurality of tubular spreader arms 32 each having an inboard end 34 and an outboard end 36 integral with a central body section 38. Each spreader assembly 30 is associated with one of the cables 14 to forceably stand off the central section 20 of the cable laterally from the mast 6.

The spreader arms 32 comprise a tubular socket 40 on the inboard end 34 and a cable guide 42 through which a cable passes 14.

The guides 42, which are removably fitted into the outboard end of the arm 32, comprise a tapered body 44 having an outboard slot 46 with a pair of nibs 48 which serve to retain the cable 14 in position in the guide 42 and on the spreader arm 32.

On the outboard end of the guides 42, there is a integral plug 50 with a groove 52 to receive an O-ring 54 that serves to retain the guides 42 in the ends 36 of the spreader arms 32.

The spreader arms 32 each have a frangible portion 56 contoured to break when the spreader arm is overloaded. In the preferred embodiments, this portion 56 is the contoured junction between the socket 40 and the central body section 38.

All the spreader assemblies 30 comprise a collar 58 sized to encircle the mast 6, a plurality of posts 60, each threaded at the inboard end 62 into a collar and sized to tightly receive the tubular sockets 40 of the spreader arms 32 to retain them extending radially outwardly from the collars 58. The collars 58 vary in structure between the different embodiments of the assemblies 30 as described below.

In preferred embodiments, the posts 60 have a slot 63 in their outboard end for use in threading them into the collars 58 and relief portions 65.

The posts 60 and sockets 40 may be of varied cross-section, but advantageously, they are cylindrical in shape, and have a plurality of peripheral grooves 64 that contain O-rings 66 which the sockets 40 of the spreader arms 32 engage for retention thereof on the posts 60 and collars 58.

Figure 10:
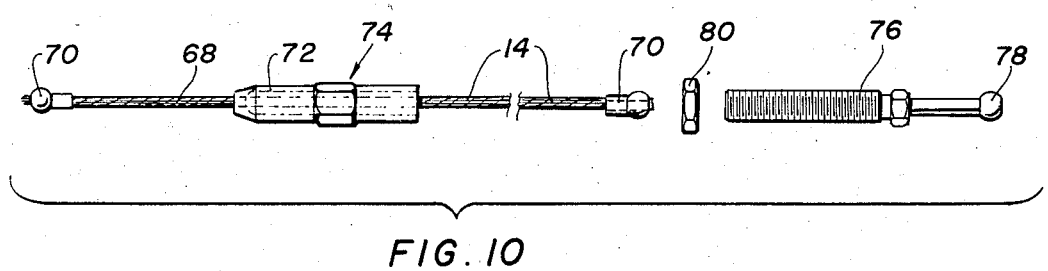
FIG. 10 is a fragmentary plan view of a truss cable assembly for the new outriggers.

Referring to FIG. 10, the different truss cables 14 vary in length, but are otherwise similar in construction. They comprise a cable 68, e.g., plyed strands of stainless steel, with balls 70 swedged on each end. The swivel section 72 of a turnbuckle 74 is captured between the balls 70. The screwlink 76 of the turnbuckle 74 has a ball 78 similar in size to balls 70 on its unthreaded end. A locknut 80 threads on the screwlink 76 so that when it is threaded the proper distance into the swivel section 72 (see FIG. 4) the turnbuckle 74 will retain it adjusted length.

Figure 5:
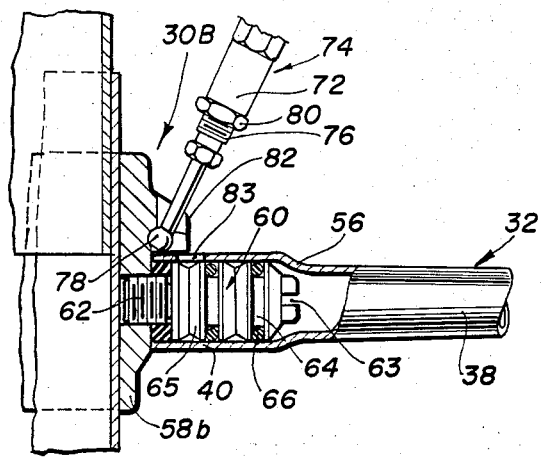
FIG. 5 is is a fragmentary, lateral view of a portion of a second embodiment of a spreader assembly of the new outriggers of the invention.
Figure 3:
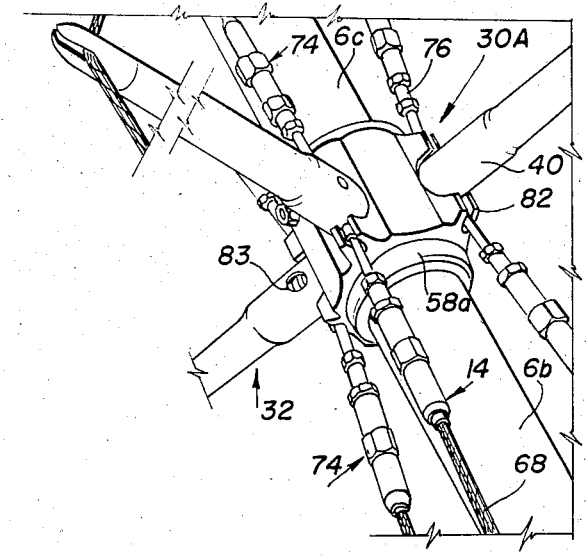
FIG. 3 is is a fragmentary, isometric view of a portion of one embodiment of a spreader assembly of the new outriggers of the invention.

Referring to FIG. 5, in the spreader assembly 30B, the collar 58b has four anchor lugs 82 extending laterally therefrom adjacent each of the four posts 60 contoured to receive and hold the ball 78 of the turnbuckle 74. The position of each anchor lug 82 relative to its respective post 60 is such that when the socket 40 of a spreader arm 32 is in place upon the post 60, the ball 78 received in the anchor lug 82 is locked in place. Turning arm 32 to position hole 83 as in FIG. 5 unlocks ball 78.

Figure 4:
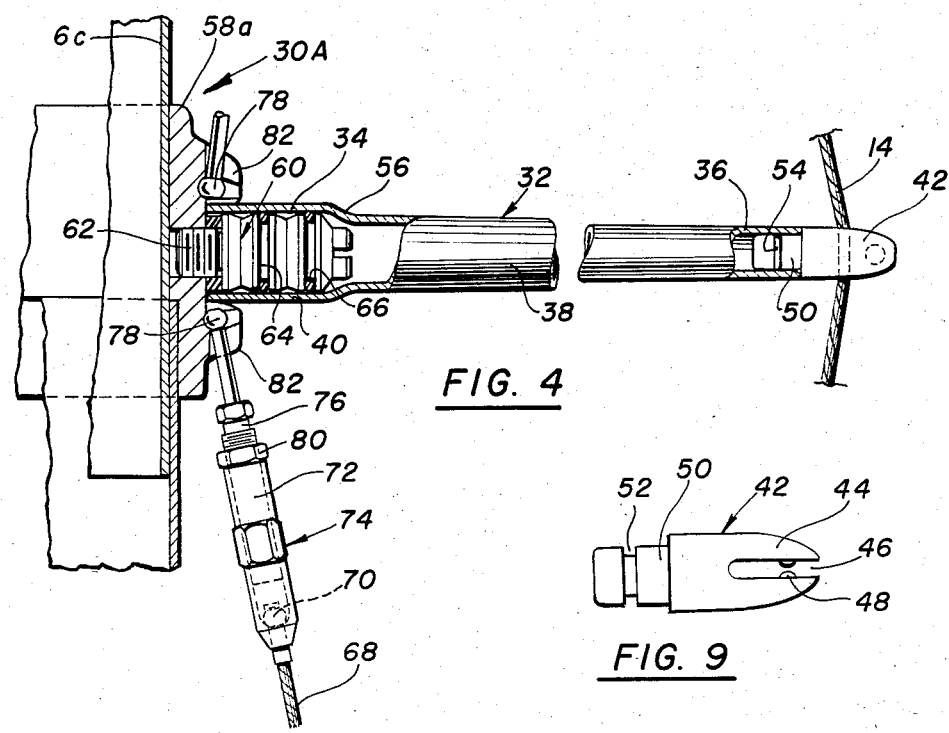
FIG. 4 is a fragmentary, lateral view, partially in section, of the spreader assembly of FIG. 3.
Figure 9:
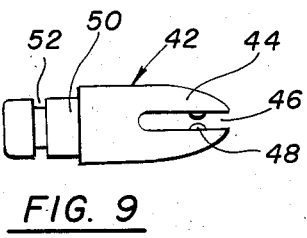
FIG. 9 is a plan view of a cable guide that is carried on the outboard end of spreader arms in the new spreader assemblies.

As shown in FIG. 4, the collar 58a of the spreader assembly 30A, has two sets, upper and lower, of anchor lugs 82 to receive the balls 78 of upper and lower turnbuckles 74 of corresponding upper and lower truss cables 14.

Figure 6:
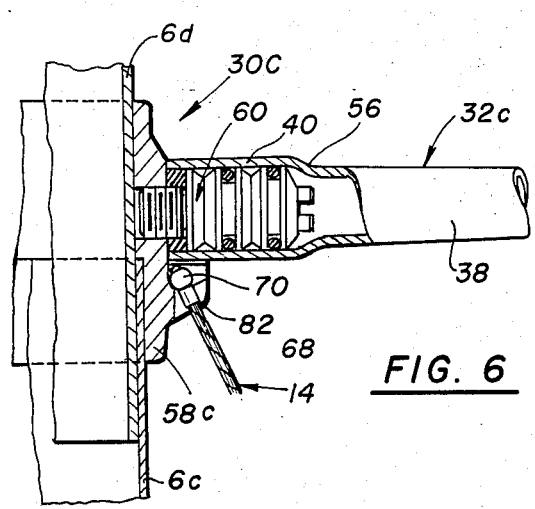
FIG. 6 is is a fragmentary, lateral view of a portion of a third embodiment of a spreader assembly of the new outriggers of the invention.
Figure 8:
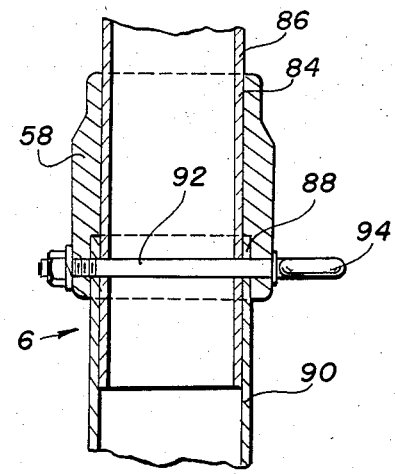
FIG. 8 is a fragmentary, lateral view of a telescoped section of a mast in the new outriggers.

As shown in FIG. 6, the collar 58c has only one set of anchor lugs 82 to receive the ball 70 on the upper end 18 of the cable 14 which depends from the collar 58c In preferred embodiments of the invention, the masts 6 comprise a plurality of tubular sections of decreasing diameter, e.g., 6a, 6b, 6c, 6d, etc., telescoped together by the collars 58 of the spreader assemblies 30. The manner in which this is arranged in shown in FIG. 8 which shows that the collars 58 comprise an upper bore 84 having an I.D. approximately equal to the O.D. of the upper tubular section 86 and a lower bore 88 having an I.D. approximately equal to the O.D. of the lower tubular section 90. The upper section 86 is telescoped into the lower section 90 and an eye-bolt 92 extends through the collar 58 and the overlapping portions of the tubular sections 86 and 90.

The eyes 94 of the bolts 92 spaced along the mast 6 serve as fairleads for the halyard 96 which is used to run outrigger clips (not shown) up to the outboard ends 10 of the outriggers 2.

Figure 7:
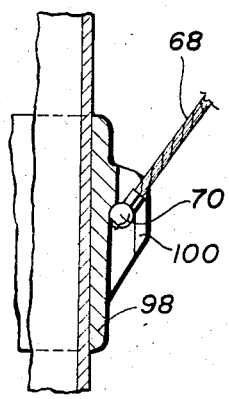
FIG. 7 is a fragmentary, lateral view, partially in section, of a truss cable anchor collar of the invention.

In order to anchor the inboard ends 16 of the lower truss cables 14 to the mast 6, a collar 98 without spreader arms having a plurality of cable anchor lugs 100 extending laterally therefrom is provided. Each such anchor lug 100 is contoured to receive and hold one of the cable end balls 70 as shown in FIG. 7.

In the illustrated embodiments, the tubular sections 6a14 6d and spreader arms 32 are formed of extruded aluminum and anodized. Collars 30 and posts 60 are machined from aluminum and the collars are anodized to match the mast sections and spreader arms in color. The turnbuckles 74, cables 14 and bolts, nuts and other fasteners are made of stainless steel. The cable guides 42 are injection molded of tough plastic, preferably in a color, e.g., black, to contrast with the color, e.g., gold, of the spreader arms 32.

Extruded aluminum is substantially more corrosion-resistant than aluminum castings. Therefore, even parts which require machining, e.g., collars 30, are formed of extruded material rather than castings.

The aluminum parts are heavily anodized to improve corrosion resistance. Such anodizing may be clear, in which case the anodized part provides the usual aluminum appearance. However, colored anodizing is preferably used to provide any desired attractive color combination to the outriggers 2.

In the new outriggers of the present invention, all the parts can be disassembled. This provides great advantages for both manufacture and use of the outriggers, As to manufacture, the outriggers may be made and packaged "knockdown" at one location and for shipment for sale and assembly at another location. Accordingly, the shipment of all the components of the outriggers 2 can be done in relatively small packages. Further, because of the spreader tip 42 structure, all of the cables 14 can be finished as shown in FIG. 10 at both ends before they are installed on the masts 6. This greatly facilitates the shipment of a complete mast and the easy assembly of the components on site by the user.

Of further importance to the user, is the ease with which repairs to the outriggers can be made. For example, if an outrigger should by accident hit a bridge span, it is likely that the impact would be via a cable 14 and this could impose such force on a spreader arm 32 to cause it to break. Such a break will occur at the frangible portion 56. Repair of this damage is minimal. Thus, the broken arm 32 and its socket 40 are pulled off from the remainder of the outrigger 2, a new spreader arm 32 is installed over the uncovered post 60, the related turnbuckle 74 is loosened to allow the related cable 14 to be inserted in the guide 42. Finally, the turnbuckle 74 is retightened and the repair job is finished.

The embodiments of the invention in which an exclusive property or privilege is claimed are defined as follows:

1. In outriggers for sportfishing boats having a tubular mast including an inboard end and an outboard end, pivot means connected to said inboard end to permit said outrigger to move from a stowage position to a fishing position, a plurality of truss cables having an inboard end, an outboard end and a central section extending therebetween, said cables being positioned about and extending longitudinally of said mast to resist bending thereof and at least one spreader assembly carried by said mast comprising a plurality of tubular spreader arms each having an inboard end and an outboard end integral with a central body section, each said spreader arm being associated with one of said cables to forceably stand off said central section of said cable laterally from said mast, the improvements which comprise:

(a) spreader arms that each comprise:
 a tubular socket on said inboard end,
 a cable guide through which one of said cables passes, said guide being removably fitted into said outboard end of said arm, and
 a frangible portion in said central body section contoured to break when said spreader arm is overloaded,
(b) spreader assemblies that comprise:
 a collar sized to encircle said mast,
 a plurality of posts, each threaded at one end into said collar and sized to tightly receive said tubular socket of one of said spreader arms to retain it extending radially outwardly from said collar,
said improvements:
protecting said mast from appreciable damage upon overloading of a spreader arm thereof,
enabling broken spreader arms to be replaced without alteration of said mast or removal of a spreader assembly from said mast and
enabling cable guides to be replaced without replacement of a spreader arm.

2. An outrigger of claim 1 wherein:
said posts and said sockets are cylindrical in shape,
said posts have a plurality of peripheral grooves therein,
each said groove contains an O-ring and
said O-rings constitute the elements that said socket of a spreader arm engages for retention thereon on said post and collar.

3. An outrigger of claim 2 wherein:
at least some of said inboard ends of said cables are tipped with a ball and
said collar has an anchor lug extending laterally therefrom adjacent each of said posts thereon to receive and hold one of said cable end balls, the position of each anchor lug relative to its respective post being such that when the socket of a spreader arm is in place upon said post the ball received in the anchor lug is locked in place by said socket.

4. An outrigger of claim 1 wherein said spreader arms taper down from said socket to said outboard end.

5. An outrigger of claim 4 wherein said frangible part is the junction between said socket and said central body section.

6. An outrigger of claim 1 wherein said mast decreases in diameter from said inboard end to said outboard end.

7. An outrigger of claim 6 wherein said mast comprises a plurality of tubular sections of decreasing diameter.

8. An outrigger of claim 7 wherein tubular sections of said mast are telescoped together by said collars of said spreader assemblies.

9. An outrigger of claim 3 which comprises a second collar without spreader arms having a plurality of cable anchor lugs extending laterally therefrom, each said anchor lug being contoured to receive and hold one of said cable end balls.

10. In outriggers for sportfishing boats having a tubular mast including an inboard end and an outboard end, pivot means connected to said inboard end to permit said outrigger to move from a stowage position to a fishing position, a plurality of truss cables having an inboard end, an outboard end and a central section extending therebetween, said cables being positioned about and extending longitudinally of said mast to resist bending thereof and at least one spreader assembly carried by said mast comprising a plurality of tubular spreader arms each having an inboard end and an outboard end integral with a central body section, each said spreader arm being associated with one of said cables to forceably stand off said central section of said cable laterally from said mast, the improvements which comprise:

(a) spreader arms that each comprise:
  a tubular socket on said inboard end,
  a cable guide through which one of said cables passes, said guide being removably fitted into said outboard end of said arm, and
  a frangible portion in said central body section contoured to break when said spreader arm is overloaded,
(b) spreader assemblies that comprise:
  a collar sized to encircle said mast,
  a plurality of posts, each threaded at one end into said collar and sized to tightly receive said tubular socket of one of said spreader arms to retain it extending radially outwardly from said collar,
at least some of said inboard ends of said cables being tipped with a ball,
said collar having anchor lugs extending laterally therefrom adjacent each of said posts thereon to receive and hold said cable end balls, the position of each anchor lug relative to its respective post being such that when the socket of a spreader arm is in place upon said post the ball received in the anchor lug is locked in place by said socket and
a hole through each of said sockets adjacent the inboard end thereof which when turned to face said anchor lug unlocks said ball permitting said ball to be removed from said assembly with said spreader arm positioned on said post, but when said hole is turned away from said anchor lug locks said ball against removal from said anchor lug while said spreader arm is positioned on said post.

* * * * *